United States Patent [19]

Wieczorrek et al.

[11] 4,409,266

[45] Oct. 11, 1983

[54] PROCESS FOR THE SHATTERPROOF COATING OF GLASS SURFACES

[75] Inventors: Wolfhart Wieczorrek, Cologne; Gerhard Mennicken, Leverkusen, both of Fed. Rep. of Germany

[73] Assignee: Bayer Aktiengesellschaft, Bayerwerk, Fed. Rep. of Germany

[21] Appl. No.: 373,370

[22] Filed: Apr. 30, 1982

[30] Foreign Application Priority Data

May 14, 1981 [DE] Fed. Rep. of Germany ....... 3119151

[51] Int. Cl.³ .......................... B05D 3/04; B05D 3/10
[52] U.S. Cl. ...................... 427/302; 65/3.41;
 215/DIG. 6; 427/407.2; 428/35; 428/425.6;
 428/429; 428/447
[58] Field of Search ...................... 427/302, 407.2, 387,
 427/389.7, 443.2, 422, 421, 429; 215/DIG. 6;
 428/35, 425.6, 429, 447; 65/3.41

[56] References Cited

U.S. PATENT DOCUMENTS

| 4,053,076 | 10/1977 | Vogel et al. | 215/12 R |
|---|---|---|---|
| 4,092,953 | 6/1978 | Waugh | 118/642 |
| 4,143,181 | 3/1979 | Cahn et al. | 427/407.2 X |
| 4,215,165 | 7/1980 | Gras et al. | 428/35 |
| 4,256,788 | 3/1981 | Gras | 428/35 |
| 4,268,554 | 5/1981 | Gras | 428/35 |

FOREIGN PATENT DOCUMENTS

| 2257031 | 6/1973 | Fed. Rep. of Germany ... 427/407.2 |
| 2529909 | 1/1976 | Fed. Rep. of Germany ... 427/407.2 |
| 1166742 | 10/1969 | United Kingdom . |

Primary Examiner—Michael R. Lusignan
Assistant Examiner—Thurman K. Page
Attorney, Agent, or Firm—Gene Harsh; Lawrence S. Pope; Thomas W. Roy

[57] ABSTRACT

The invention relates to a new process for the shatterproof coating of glass surfaces by coating the surfaces with a coating composition based on a two-component system reacting fully to form a polyurethane, the glass surfaces to be coated being coated before application of the coating composition with a physically drying priming lacquer containing a silane adhesion promoter and a catalyst which accelerates hardening of the coating composition and, as binder, a polyurethane polyurea which has a linear molecular structure and which is soluble in lacquer solvents.

13 Claims, No Drawings

PROCESS FOR THE SHATTERPROOF COATING OF GLASS SURFACES

BACKGROUND OF THE INVENTION

1. Field of the Invention

This invention relates to an improved process for coating glass surfaces, particularly glass bottles, to improve their resistance to shattering.

2. Description of the Prior Art

The coating of glass surfaces, particularly glass bottles, with a transparent layer of polyurethane to improve their resistance to shattering is known and has been the subject of numerous publications (cf. German Offenlegungsschrift Nos. 2,731,776; 2,746,017 and 2,746,006).

In all these publications, the glass surfaces are coated with solvent-free two-component coating compositions. Before coating, the glass surfaces are treated with an aqueous or alcoholic silane size to improve the adhesion of the lacquer to the glass. In practice, the glass surface pretreated with the adhesion promoter is normally dried at temperatures around 100° C. to enable the pretreatment to develop its full adhesion-promoting effect. In addition to the two-component polyurethane system and the usual additives and auxiliaries, the coating composition applied in the second stage of the process contains in particular catalysts which accelerate hardening of the binder, i.e. the isocyanate addition reaction. A serious practical disadvantage in this respect is that the processing time of the two-component polyurethane coating compositions is shortened to a considerable extent by the presence of the catalysts.

In addition, it is known from German Auslegeschrift No. 1,621,883 that a lacquer layer containing a catalyst which accelerates the isocyanate addition reaction may be initially applied to surfaces to be coated with solvent-containing polyurethane lacquer, the lacquer layer thus obtained subsequently being coated with a solvent-containing catalyst-free two-component polyurethane lacquer. The first lacquer layer is dissolved to an extent and some of the catalyst is carried by convection into the surface lacquer where it is activated.

It has now surprisingly been found that this principle may also be applied to solvent-free coating compositions of the type used for coating glass surfaces. It has also been found that the priming lacquer used for this purpose may also contain the known silane-based adhesion promoters and that there is no need for the priming lacquer to be stoved if, at the same time, it contains a binder based on a linear polyurethane polyurea of the type described in detail hereinafter. Another advantage of using a priming lacquer of this type lies in the increased mechanical strength of the coating as a whole because the simultaneous use of a priming lacquer containing a fully reacted polyurethane polyurea as binder and of a coating composition containing a two-component polyurethane system as binder leads to a particularly favorable composite system.

Accordingly, the priming lacquer used in the process according to the invention, which is described in detail hereinafter, performs three functions, namely:

1. it improves the adhesion of the organic coating to glass;
2. it catalyzes the hardening reaction of the organic coating; and
3. it improves the resistance to shattering for which the coating is intended.

This gives rise to the following advantages over the hitherto known procedure:

1. there is no need for the silane layers to be dried at elevated temperature, thereby saving energy;
2. the mechanical properties of the film are better adapted to the specific requirements of shatterproofing, thereby providing for greater latitude in the formulation of the coating composition; and
3. the processing time of the surface lacquer is lengthened by a factor of 15 or more which provides for easier handling and greater production safety.

SUMMARY OF THE INVENTION

Accordingly, the present invention relates to a process for the shatterproof coating of glass surfaces by applying a physically drying priming lacquer containing a silane adhesion promoter and subsequently coating the physically dried priming lacquer layer thus produced with a solvent-free or substantially solvent-free coating composition containing a two-component system reacting to form a polyurethane as binder and, optionally, standard additives and auxiliaries, characterized in that the priming lacquer contains (a) as binder a polyurethane polyurea which has a linear molecular structure and which is soluble in lacquer solvents and, in addition, (b) at least one catalyst which accelerates the isocyanate addition reaction leading to hardening of the coating composition.

DETAILED DESCRIPTION OF THE INVENTION

The priming lacquer used in the process according to the invention comprises four components, namely:

(a) a suitable solvent or solvent mixture, (b) an elastomeric polyurethane polyurea which has a substantially linear molecular structure, which is soluble in the solvent, and which is used in a quantity of from about 5 to 25% by weight, based on the total weight of the priming lacquer, (c) a silane adhesion promoter which is generally used in a quantity of from about 0.2 to 3% by weight, based on the total weight of the priming lacquer and (d) at least one catalyst which accelerates the isocyanate addition reaction responsible for the hardening of the coating composition and which is used in a total quantity of from about 0.2 to 2% by weight, based on the total weight of the priming lacquer.

Suitable solvents (a) are the usual lacquer solvents such as, for example, ethyl acetate, butyl acetate, methyl glycol acetate, ethyl glycol acetate, toluene, xylene and/or alcohols, such as ethanol or isopropanol.

Suitable polyurethane polyureas (b) are, in particular, those based on (i) aliphatic or cycloaliphatic diisocyanates, (ii) polyester diols having a molecular weight in the range from about 1000 to 2500 and (iii) aliphatic or cyloaliphatic diprimary diamines.

The isocyanate component (i) consists of an aliphatic or cycloaliphatic diisocyanate having a molecular weight in the range from about 168 to 300, of the type known per se in polyurethane chemistry. Examples of suitable diisocyanates are hexamethylene diisocyanate, 4,4'-diisocyanato-dicyclohexyl methane or 1-isocyanato-3,3,5-trimethyl-5-isocyanato-methyl cyclohexane (isophorone diisocyanate or IPDI). IPDI is particularly preferred.

The polyester diols are preferably polyester diols having a molecular weight in the range from about 1000 to 2500 and, more particularly, in the range from about 2100 to 2400, of the type obtained by reacting dicarboxylic acids, such as succinic acid, adipic acid or suberic acid, with a stoichiometric excess of simple glycols, such as ethylene glycol, 1,4-dihydroxybutane and/or 1,6-dihydroxyhexane.

The diamines (iii) are aliphatic or cycloaliphatic diamines having a molecular weight in the range from about 60 to 300, such as for example ethylene diamine, tetramethylene diamine, hexamethylene diamine, 4,4'-diamino-dicyclohexyl methane or, in particular, 1-amino-3,3,5-trimethyl-5-aminomethyl cyclohexane (isophorone diamine or IPDA).

The polyurethane polyureas are generally produced by initially preparing an NCO-prepolymer from the polyester diol and the diisocyanate using an excess of diisocyanate e.g. corresponding to a molar NCO/OH ratio of from 1,5:1 to 5:1, preferably 2:1 to 3,5:1 and subsequently chain-extending the NCO-prepolymer thus formed with the diamine (iii). The polyurethane polyureas are fully reacted compounds, i.e. the reactants are generally used in such quantities that the equivalent ratio between isocyanate groups on the one hand and hydroxyl and amino groups on the other hand amounts to between about 0.8:1 and 1.2:1 and preferably about 1:1.

The silane adhesion promoter (c) is generally a compound corresponding to the following formula

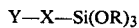

in which
R represents an alkyl radical containing from 1 to 4 carbon atoms,
X represents an alkylene radical containing from 2 to 4 carbon atoms and
Y represents a primary amino, hydroxyl, mercapto or

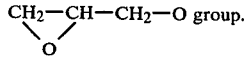
group.

Suitable silane adhesion promoters are, for example, the silane adhesion promoters mentioned in the German Offenlegungsschrifts cited above.

Component (d) is one of the usual accelerators for the isocyanate addition reaction known from polyurethane chemistry, such as for example a tertiary amine, such as N,N-dimethyl aniline or triethylene diamine, and in particular an organo tin or organo zinc compound, such as tin(II)octoate, dibutyl tin dilaurate or zinc octoate.

The coating compositions used in the process according to the invention are generally in the form of a solvent-free clear lacquer having a viscosity in the range from about 1000 to 8000 and preferably in the range from about 1000 to 7000 mPas/23° C. which contains
  (a) as binder a two-component system reacting fully to form a polyurethane and, optionally,
  (b) standard auxiliaries and additives, such as leveling agents, stabilizers or UV-absorbers.

The binder (a) of the coating composition generally consists of a mixture of at least one aliphatic or cycloaliphatic polyisocyanate with at least one organic polyhydroxyl compound, the quantitative ratios between the reactants being selected in such a way that the NCO-/OH-equivalent ratio amounts to between about 0.8:1 and 1.2:1 and preferably about 1:1.

Suitable aliphatic or cycloaliphatic polyisocyanates are, for example, polyisocyanates containing biuret groups of the type obtained by the introduction of biuret groups into hexamethylene diisocyanate, polyisocyanates containing isocyanurate groups of the type obtained by trimerizing some of the isocyanate groups in hexamethylene diisocyanate, isophorone diisocyanate, 4,4'-diisocyanato-cyclohexyl methane or reaction products of these simple diisocyanates with substoichiometric quantities of polyhydric alcohols having a molecular weight in the range from about 62 to 1000, such as for example ethylene glycol, trimethylol propane, 1,2-dihydroxypropane or alkoxylation, particularly propoxylation, products of simple polyols such as those with molecular weights in the above-mentioned range.

The polyol component of the coating composition used in the process according to the invention generally comprises polyester polyols or, in particular, polyether polyols or mixtures of polyols such as these which generally contain from 2 to 6 and preferably and 2 to 3 hydroxyl groups. The polyol component generally has an (average) molecular weight in the range from about 300 to 2000 and preferably in the range from about 450 to 1200. Suitable polyester polyols are, for example, those of the type already mentioned by way of example with regard to the polyurethane polyureas or, in addition, polyester polyols of that type obtained by reacting dicarboxylic acids of the type mentioned by way of example with regard to the polyurethane polyureas and/or phthalic acid, tetrahydrophthalic acid or hexahydrophthalic acid or their anhydrides with excess quantities of polyols of the type mentioned by way of example in the preceding paragraph and/or higher functionality alcohols, such a trimethylol propane and/or glycerol. The preferred polyether alcohols are generally alkoxylation products, i.e. ethoxylation and, in particular, propoxylation products, or simple starter molecules of the type already mentioned by way of example in the preceding paragraph.

Polyether alcohols modified with substoichiometric quantities of diisocyanates of the type mentioned by way of example with regard to the polyurethane polyureas are also suitable.

The viscosity of the coating composition may be adjusted to a value within the ranges mentioned above by suitably selecting the starting components and, in particular, by the way in which they are modified. For example, it is possible if desired to adjust the viscosity of simple diisocyanates, such as IPDI, by modification with substoichiometric quantities of polyols or to increase the viscosity of polyether alcohols by modifying them with substoichiometric quantities of diisocyanates. On the other hand, the viscosity of the coating composition may also be reduced if desired by using small quantities (up to about 15% by weight) of standard lacquer solvents, although the use of these lacquer solvents is less preferred.

To carry out the process according to the invention, the priming lacquer is applied by standard coating techniques in such a quantity that a dry film thickness of from about 0.005 to 0.02 mm and preferably from about 0.008 to 0.015 mm is obtained. The glass surfaces are generally coated with the priming lacquer at room temperature. For physically drying the priming lacquer, it is sufficient to keep the glass surface at room temperature for a suitable period. Physical drying of the priming lacquer may of course also be carried out at elevated temperature (up to about 100° C.), although this is not absolutely essential.

The glass objects coated with the priming lacquer may be overcoated with the coating composition at any later stage. In this case, too, application is carried out by any of the methods normally used for applying lacquers (knife coating, dip coating, spray coating, casting, brush coating). The second coating is generally applied in a layer thickness of from about 0.1 to 0.25 mm and preferably in a layer thickness of from about 0.15 to 0.25 mm. The lower limits are essential to guarantee sufficient shatter resistance of the coated glass whereas the upper limit is not at all essential in this respect but only of economical interest. A coating thickness about 0.25 mm would only increase costs without any substantial improvement of the shatter resistance. The coating may be hardened by heating the coated glass objects for about 10 to 30 minutes to a temperature of from about 110° to 190° C. and preferably to a temperature of from about 120° to 140° C.

The process according to the invention is particularly suitable for the shatterproof coating of glass bottles.

The percentages quoted in the following Examples are all percentages by weight.

The following coating compositions were used in the Examples.

Priming Lacquer G 1

0.5 part by weight of γ-aminopropyl triethoxy silane and 0.5 part by weight of γ-mercapto propyl trimethoxy silane are added to 85 parts by weight of solvent mixture of isopropanol, toluene and methyl glycol acetate (170:145:25). 15 parts by weight of a nonreactive, linear, elastomeric polyurethane polyurea based on 3,2 moles of IPDI, 1,0 mol of a polyester diol of adipic acid and 1,4-dihydroxy butane (molecular weight 2250)and 2,2 moles of IPDA as chain extender are dissolved in the mixture obtained.

1 part by weight of dibutyl tin dilaurate is then added.

Priming Lacquer G 2

Same composition as priming lacquer G 1, except that 1 part by weight of zinc octoate is used instead of dibutyl tin dilaurate.

Priming Lacquer G 3

Same composition as priming lacquer G 1, except that 1 part by weight of γ-aminopropyl triethoxy silane is used instead of the above silane mixture.

Coating Composition B 1

Component I

A hydroxyl group-containing adduct of 72 parts by weight of a trifunctional polyether alcohol having a molecular weight of 450 obtained by propoxylating trimethylol propane, 20 parts by weight of polypropylene glycol having a molecular weight of 2000 and 8 parts by weight of 4,4'-diisocyanato-dicyclohexyl methane.

Component II

An isocyanate group-containing adduct of 8 parts by weight of trifunctional polyether alcohol having a molecular weight of 450 obtained by propoxylating trimethylol propane and 76 parts by weight of 4,4'-diisocyanato-dicyclohexyl methane.

To produce coating composition B 1, components I and II are mixed in a ratio by weight of 100:84 in the presence of 0.5% of a standard commercial leveling agent (Byk 300 of Byk-Mallinckrodt, Wesel, Germany). Coating composition B 1 has a viscosity of 1500 mPas/23° C.

Coating Composition B 2

Component I

A hydroxyl group-containing adduct of 100 parts by weight of the previously mentioned trifunctional polyether alcohol having a molecular weight of 450 and 9.7 parts by weight of hexamethylene diisocynate.

Component II

A biuret polyisocyanate having an NCO-content of 22% obtained by biuretizing hexamethylene diisocyanate.

Components I and II are mixed in a ratio by weight of 100:103 in the presence of 0,5% of a commerical leveling agent used for composition B 1. Coating composition B 2 has a viscosity of 6500 mPas/23° C.

Coating Composition B 3

Component I

A hydroxyl group-containing adduct of 66 parts by weight of the previously mentioned trifunctional polyether alcohol having a molecular weight of 450, 20 parts by weight of polypropylene glycol having a molecular weight of 2000 and 7 parts by weight of isophorone diisocyanate.

Component II

An isocyanate group-containing adduct of 14 parts by weight of the already mentioned trifunctional polyether alcohol having a molecular weight of 450 and 55 parts by weight of isophorone diisocynate.

Components I and II are mixed in a ratio by weight of 100:74 in the presence of 0,5% of the commercial leveling agent used for composition B 1. Coating composition B 3 has a viscosity of 3700 mPas/23° C.

EXAMPLES

In the Examples set out below in the form of a Table, panes of window glass measuring 20×30×0.6 cm are coated in the usual way (column (A)). To this end, the panes of glass are first dipped at room temperature into a 1% solution of γ-aminopropyl trimethoxy silane in a mixture of isopropanol and toluene in a ratio of 1:1 and, after brief draining, are dried for 10 minutes at 100° C. The panes of glass thus coated with a silane size are then knife coated at room temperature with the described coating compositions. The following quantities of dibutyl tin dilaurate are added to the coating compositions to catalyze the hardening reaction:
Coating composition B 1+0.05%
Coating composition B 2+0.01%
Coating composition B 3+0.05%

The coating compositions are hardened by heating for 20 minutes to 120° C. The coating composition has a dry film thickness of 0.15 mm.

Using the starting materials specified above, panes of window glass of the same size are coated in accordance with the invention without the silane pretreatment. The coating compositions according to the invention are applied by knife coating. The priming lacquer layer has a dry film thickness of 0.01 mm in each case. The layer thickness of the coating compositions amounts to 0.15 mm in each case. The coating compositions are each applied at room temperature. Before the coating compositions are applied, the layer of priming lacquer is physically dried by standing for 60 minutes at room temperature. The coating compositions are hardened by heating for 20 minutes to 120° C. The results obtained in accordance with the invention are shown in columns B.

The degree of hardening is measured on the coated panes of glass. To determine elongation, tensile strength and tear propagation resistance, corresponding free films are used, being correspondingly produced on a polyolefin support and having a total layer thicknes of 0.15 mm (conventional process) and 0.16 mm (process according to the invention).

| Procedure | A | B | A | B | A | B |
|---|---|---|---|---|---|---|
| Silane pretreatment of the glass surface | + | − | + | − | + | − |
| Priming lacquer | — | G 1 | — | G 2 | — | G 3 |
| Coating lacquer | B 1 | B 1 | B 2 | B 2 | B 3 | B 3 |
| % of accelerator in the coating composition (dibutyl tin dilaurate) | 0.05 | — | 0.01 | — | 0.05 | — |
| Standing time of the coating composition (h) | 1 | 100 | 6 | 100 | 5 | 100 |
| Degree of hardening (pencil hardness) after stoving (20 minutes/120° C.) | HB | HB | HB | B | HB | HB |
| Elongation according to DIN 53 455 (%) | 15 | 110 | 43 | 94 | 146 | 200 |
| Tensile strength according to DIN 53 455 (N/mm²) | 18.9 | 25.6 | 19.0 | 27.5 | 12.1 | 18.5 |
| Tear propagation resistance according to DIN 53 315 (N/mm) | 50.5 | 62.5 | 44.3 | 47.2 | 37.1 | 50.9 |

Generally sufficient shatter resistance is provided (a bottle coated with the coatings does not burst into splinters of glass when it is dropped from a height of 1,5 m onto a concrete floor) if following conditions are fulfilled simultaneously: The thickness of the coating should be at least 0,15 mm, the elongation should be at least 90%, the tensile strength should be at least 15 N/mm² and the tear propagation resistance should be at least 40 N/mm.

What is claimed is:

1. A process for coating glass surfaces to render them shatterproof which comprises
   (a) applying a physically drying priming lacquer which comprises
      (i) a silane adhesion promoter,
      (ii) a polyurethane polyurea binder which has a linear molecular structure and which is soluble in lacquer solvents,
      (iii) at least one catalyst which accelerates the isocyanate-addition reaction, and
      (iv) at least one solvent,
   (b) drying the priming lacquer,
   (c) coating the dried priming lacquer with a solvent-free or substantially solvent-free coating composition containing a two-component polyurethane binder comprising an isocyanate-reactive component and an isocyanate-containing component, and
   (d) reacting the two-component polyurethane binder to harden the coating composition.

2. The process of claim 1 wherein the polyurethane polyurea binder is used in a quantity of about 5 to 25% by weight, based on the weight of the priming lacquer.

3. The process of claim 1 or 2 wherein the catalyst component(a)(iii) is used in a quantity of about 0.2 to 2% by weight, based on the weight of the priming lacquer.

4. The process of claim 1 or 2 wherein the silane adhesion promoter is used in a quantity of about 0.2 to 3% by weight, based on the weight of the priming lacquer.

5. The process of claim 1 or 2 wherein the polyurethane polyurea binder is prepared from components comprising an aliphatic or cycloaliphatic diisocyanate, a polyester diol having a molecular weight of about 1000 to 2500, and an aliphatic or cycloaliphatic diprimary diamine.

6. The process of claim 5 wherein said diisocyanate comprises a member selected from the group consisting of 4,4'-diisocyanato-dicyclohexyl methane and 1-isocyanato-3,3,5-trimethyl-5-isocyanatomethyl cyclohexane.

7. The process of claim 5 wherein said diprimary diamine is 1-amino-3,3,5-trimethyl-5-aminomethyl cyclohexane.

8. The process of claim 1 or 2 wherein said isocyanate-reactive component comprises a polyether polyol or polyester polyol.

9. The process of claim 1 or 2 wherein said isocyanate-containing component contains aliphatically-bound and/or cycloaliphatically-bound isocyanate groups.

10. The process of claim 1 or 2 wherein said coating composition does not contain a catalyst for the isocyanate-addition reaction.

11. A process for coating glass surfaces to render them shatterproof which comprises
    (a) applying a physically drying priming lacquer which comprises based on the total weight of the priming lacquer
       (i) about 0.2 to 3% by weight of a silane adhesion promoter,
       (ii) about 5 to 25% by weight of a polyurethane polyurea binder which has a linear molecular structure, is soluble in lacquer solvents and is based on at least one aliphatic or cycloaliphatic diisocyanate, at least one polyester diol having a molecular weight of about 1000 to 2500 and at least one aliphatic or cycloaliphatic diprimary diamine,
       (iii) about 0.2 to 2% by weight of a catalyst which accelerates the isocyanate-addition reaction, and
       (iv) at least one solvent,
    (b) drying the priming lacquer,
    (c) coating the dried priming lacquer with a solvent-free or substantially solvent-free coating composition containing a two-component polyurethane binder comprising an isocyanate-reactive component containing a polyether polyol or polyester polyol and an isocyanante-containing component having aliphatically-bound and/or cycloaliphatically-bound isocyanate groups and which does not contain a catalyst for the isocyanate-addition reaction, and
    (d) reacting the two-component polyurethane binder to harden the coating composition.

12. The process of claim 11 wherein said diisocyanate comprises a member selected from the group consisting of 4,4'-diisocyanato-dicyclohexyl methane and 1-isocyanato-3,3,5-trimethyl-5-isocyanatomethyl cyclohexane.

13. The process of claim 11 wherein said diprimary diamine is 1-amino-3,3,5-trimethyl-5-aminomethyl cyclohexane.

* * * * *